United States Patent
Clark et al.

(10) Patent No.: US 11,070,896 B1
(45) Date of Patent: Jul. 20, 2021

(54) DYNAMIC OPTICAL SWITCHING IN A TELECOMMUNICATIONS NETWORK

(71) Applicant: Level 3 Communications, LLC, Broomfield, CO (US)

(72) Inventors: Laurel Clark, Denver, CO (US); Clyde David Cooper, III, Louisville, CO (US); Andrew Dugan, Superior, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 16/798,173

(22) Filed: Feb. 21, 2020

Related U.S. Application Data (60) Provisional application No. 62/809,128, filed on Feb. 22, 2019, provisional application No. 62/915,587, filed on Oct. 15, 2019.

(51) Int. Cl.
*H04B 10/00* (2013.01)
*H04Q 11/00* (2006.01)
*H04J 14/02* (2006.01)
*H04J 14/00* (2006.01)

(52) U.S. Cl.
CPC ...... *H04Q 11/0062* (2013.01); *H04J 14/0201* (2013.01)

(58) Field of Classification Search
CPC .... H04B 10/27; H04B 10/272; H04B 10/275; H04J 14/02; H04J 14/0201; H04J 14/0227; H04J 14/0267; H04J 14/0278; H04J 14/028; H04J 14/0282; H04J 14/0283; H04Q 11/0001; H04Q 11/0062; H04Q 2011/0079; H04Q 2011/0086; H04Q 2011/009; H04Q 2011/0092; H04Q 2011/0094; H04Q 2011/0096
See application file for complete search history.

(56) References Cited

U.S. PATENT DOCUMENTS

2004/0208538 A1* 10/2004 Liwak ................. H04J 14/0294
398/45

* cited by examiner

*Primary Examiner* — Daniel G Dobson (57) ABSTRACT

Implementations described and claimed herein provide systems and methods for a configurable optical peering fabric to dynamically create a connection between participant sites without any physical site limitations or necessity of specialized client and network provider equipment being located within such a facility. Client sites to a network may connect to a configurable switching element to be interconnected to other client sites in response to a request to connect the first client site with a second site, also connected to network, via the switching element. A request may trigger verification of the requested and, upon validation, transmission of an instruction to the switching element to enable the cross connect within the switching element. The first site and the second site may thus be interconnected via the switching element in response to the request, without the need to co-locate equipment or to manually install a jumper between client equipment.

20 Claims, 6 Drawing Sheets

DYNAMIC OPTICAL SWITCHING IN A TELECOMMUNICATIONS NETWORK

CROSS-REFERENCE TO RELATED APPLICATIONS

This application is related to and claims priority under 35 U.S.C. § 119(e) from U.S. Provisional Application No. 62/809,128 filed Feb. 22, 2019 entitled "OPTICAL PEERING FABRIC IN A TELECOMMUNICATIONS NETWORK," and from U.S. Patent Application No. 62/915,587, filed Oct. 15, 2019 entitled "OPTICAL PEERING FABRIC IN A TELECOMMUNICATIONS NETWORK," which are hereby incorporated by reference in their entirety for all purposes.

TECHNICAL FIELD

Embodiments of the present disclosure generally relate to systems and methods for implementing a telecommunications or data network, and more specifically for dynamically interconnecting wavelengths or other optical signals among participants between one or more sites connected to a configurable switching element.

BACKGROUND

Telecommunication networks provide, among other functions, connections via a backbone network between clients of the network and various possible other networks. For example, a telecommunication network may provide one or more clients or customer networks with access, via the network, to a cloud computing network where the client can obtain some service from the cloud computing network, such as compute, network, and storage services provided by a cloud service provider. Conventionally, providing the access includes the telecommunications network configuring a cross-connect between the client network and the cloud computing network in a co-location center. However, such co-location centers are often operated by and maintained by a third party that is different than the carrier network and/or the cloud computing network. Thus, establishing the cross-connect between the client network and the cloud provider (or other service-providing network) may include contacting an operator of the co-location center to configure the cross connect, which often includes a manual operation to install some form of connection, often a jumper, between the carrier network equipment and the cloud provider equipment installed at the co-location center. To facilitate the interconnection, each of the carrier network and the cloud provider network have to co-locate telecommunication equipment in the co-location center, increasing the cost overhead for utilizing the co-location center for interconnecting the networks. This manual process of interconnecting the networks and locating network specific equipment at the co-location center may include significant costs to the carrier network, client network, and/or the cloud service provider network.

It is with these observations in mind, among others, that aspects of the present disclosure were conceived.

SUMMARY

One implementation of the present disclosure may take the form of a system for managing a network. The system may include an optical switching element of a data network, the optical switching element configured to dynamically connect, in response to an activation signal, the signals or wavelengths of a first interface of the optical switching element to the signals or wavelengths of a second interface of the optical switching element, the first interface connected to a first site via a first optical fiber connection and the second interface connected to a second site via a second optical fiber connection. The optical switching element may be configured to receive a signal to create a cross connection, the signal from an orchestrator in communication with the optical switching element, the orchestrator transmitting the activation signal to the optical switching element in response to a connection request. Further, responsive to receipt of the activation signal, the optical switching element may cross connect the first site with the second site.

In some instances, the first site may be associated with a cloud computing provider network and the second site may be associated with a carrier network. In other instances, the first site may be associated with a first carrier network and the second site may be associated with a second carrier network or the first site may be associated with a first cloud computing provider network and the second site may be associated with a second cloud computing provider network. Further, the orchestrator may receive the connection request from a computing device associated the carrier network, the connection request comprising an identification of the second site connected to the second interface.

In still other implementations, the first site comprises fiber terminating equipment, a first optical fiber cable connecting the fiber terminating equipment of the first site and the optical switching element and second site comprises fiber terminating equipment, a second optical fiber cable connecting the fiber terminating equipment of the second site and the optical switching element. The distance of the first optical fiber cable and the second optical fiber cable is less than a maximum distance length of optical fiber based on an acceptable transmission line loss of the optical fiber and neither the cloud computing provider network nor the carrier network installs networking equipment in the data network to terminate the first optical fiber cable or the second optical fiber cable. Also, in one implementation the optical switching element is a reconfigurable optical add-drop multiplexer network device.

Another implementation of the present disclosure may take the form of a method for managing a network. The method may include the operations of authenticating, at a network orchestrator, a request for a connection of a first participant network site with a second participant network site, the request comprising an identification of a first network associated with the first participant network site, an identification of the second participant network site, and an identification of an optical switching element for the connection and receiving an authorization, at the network orchestrator and from a computing device associated with the second participant network site, for executing the requested connection. The method may further include the operation of transmitting an activation instruction to the optical switching element to optically connect a first interface of the optical switching element connected to the first participant network site to a second interface of the optical switching element connected to the second participant network site.

In some instances, the request for the connection is received at the network orchestrator from a computing device associated with the first participant network site. The request may be received via a portal or via an application programming interface. Further, the method may also include the operations of receiving, from the optical switching element, a notification of the connection of the first interface to the second interface and transmitting the notification to the computing device associated with the first participant network site.

In still other implementations, the first participant network site is connected to the first interface of the optical switching element via a first dark fiber connection and the second participant network site is connected to the second interface of the optical switching element via a second dark fiber connection. Authenticating the request for a connection may comprise verifying the connection of the first participant network site to the first interface of the optical switching element and the connection of the second participant network site to the second interface of the optical switching element.

Yet another implementation of the present disclosure may include a data network comprising an optical switching device connected to a plurality of participant sites via a plurality of fiber bundle connections, wherein each participant site is within a network area defined by a transmission line loss value of an optical fiber conductor connecting the optical switching device to a participant site. The network area may be further defined by a bandwidth value for transmission of data from the optical switching device and the transmission line loss value may comprise an upper bound, based on the bandwidth value for the transmission of data, of line loss and a lower bound, based on the bandwidth value for the transmission of data, of line loss.

Another implementation of the present disclosure may include a method for providing a data network. The method may include the operation of connecting, via a plurality of optical fiber connections, a plurality of participant sites to an optical switching device, each of the plurality of participant sites connected to the optical switching device with a respective optical fiber connection of the plurality of optical fiber connections, wherein a total length of each of the respective optical fiber connections is defined by an acceptable transmission line loss value based on a type of optical fiber of the respective optical fiber connection.

Another implementation of the present disclosure may include a non-transitory computer-readable storage medium, storing a computer program. When the computer program is executed by a processor, the computer program may cause the processor to perform a method comprising determining a network service area of a plurality of participant sites connected to an optical switching device via a plurality of optical fiber connections, each of the plurality of participant sites connected to the optical switching device with a respective optical fiber connection of the plurality of optical fiber connections, wherein a total length of each of the respective optical fiber connections is defined by an acceptable transmission line loss value based on a type of optical fiber of the respective optical fiber connection.

Another implementation of the present disclosure may include a telecommunications network comprising a plurality of participant sites connected, via a plurality of optical fiber connections, to an optical switching device, each of the plurality of participant sites connected to the optical switching device with a respective optical fiber connection of the plurality of optical fiber connections, wherein a total length of each of the respective optical fiber connections is defined by an acceptable transmission line loss value based on a type of optical fiber of the respective optical fiber connection.

While multiple embodiments are disclosed, still other embodiments of the present disclosure will become apparent to those skilled in the art from the following detailed description, which shows and describes illustrative embodiments of the disclosure. As will be realized, the invention is capable of modifications in various aspects, all without departing from the spirit and scope of the present disclosure. Accordingly, the drawings and detailed description are to be regarded as illustrative in nature and not restrictive.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Aspects of the present disclosure include systems, methods, networking devices, and the like for a configurable optical peering fabric to dynamically create a connection between participant sites without any physical site limitations or necessity of specialized client and network provider equipment being located within such a facility. The optical peering fabric described herein may provide several advantages over conventional co-location cross-connect arrangements including eliminating the need to co-locate network equipment in a shared co-location center, eliminating the need for physical (manual) cross connects, eliminating the need to locate a participant site geographically near the co-locate center, and/or eliminating the multiple fees involved with utilizing a co-location center for cross connecting participant sites. In particular, client sites to a network may connect to a network device, such as a configurable switching element, to be interconnected to other client sites. A computing device of a first client site may provide a request to connect the first client site with a second site, also connected to network, via the switching element. The second site may be associated with the first client or may be associated with a second client to the network. A request may trigger verification of the propriety of the requested connection to the second site, and, upon validation, transmission of an instruction to the switching element to enable the cross connect within the switching element. The first site and the second site may thus be interconnected via the switching element in response to the request, without the need to co-locate equipment or to manually install a jumper between client equipment. Rather, the connection may be executed remotely via a controller within the switching element in response to the request. In addition, the use of the switching element may remove the need for a co-location facility altogether, the need to provide and maintain equipment in such a co-location center, and eliminate the various fees for the same.

In one example, the connection may be considered a signal path between participant sites created by the switching element. For example, after proper command, the switching element creates a signal path between participant site A and participant site B, where the signal path may involve a wavelength. The signal path may be operable to communicate any form of signal (optical, electrical, combinations thereof, etc.) and the content represented in such signal may include any form of payload (signaling information, data, etc.).

In one instance, an orchestrator may receive the request to connect a first network site associated with a first participant network with a second network site associated with a second participant network via a configurable optical switching fabric or element. The orchestrator may authenticate the requesting participant and verify the requesting participant is authorized to connect the first network site with the second network site. In one example, the requesting participant may be a computing device associated with an administrator of the first network site to request the connection of the first network site to the second network site. The orchestrator receiving the request may also provide the request from the first participant to the second participant to verify the requested connection. Upon verification, the orchestrator may configure the optical switching element to activate the requested connection between the participant networks or sites. In this example, the configuration of the optical switching element connects the first network site managed by the first participant to the second network site managed by the second participant. Each participant network site may include a dark fiber connection, which is "lit", to the switching element for transmitting data between the participating network sites and the switching element. Once connected, the participating network sites may exchange networking and data traffic via the switching element.

In this manner, embodiments described herein are generally directed to an optical peering fabric that enables interconnection among participants having one or more participant sites connected to a telecommunications network (e.g., metropolitan market) whereby interconnection capacity may be dynamically turned up, turned down and re-routed at fixed bandwidth increments, for example, via software-based control (e.g., SDN) by each participant. Participants can be administratively autonomous organizations that have one or more participant sites within each distinct market.

In addition, a service area for providing dynamically-controllable interconnection for participating sites may be defined based on an acceptable transmission loss for optical fiber connecting the participating sites to the switching element of the network. In particular, based on a transmission line loss of the connecting fibers and, in some instances, the bandwidth of the connection to the network, a service distance for dynamic connection service may be defined. Participant sites within the service area may connect to the network (and more particularly, the switching element of the network) to receive the dynamic connection service from the network. The service may expand the available participant sites for receiving the connection service while removing the need for participant sites to place equipment within and to communicate with a co-location center. This may improve the performance of the participating sites while reducing the cost for connecting the sites with other sites in the service area.

Figure 1:
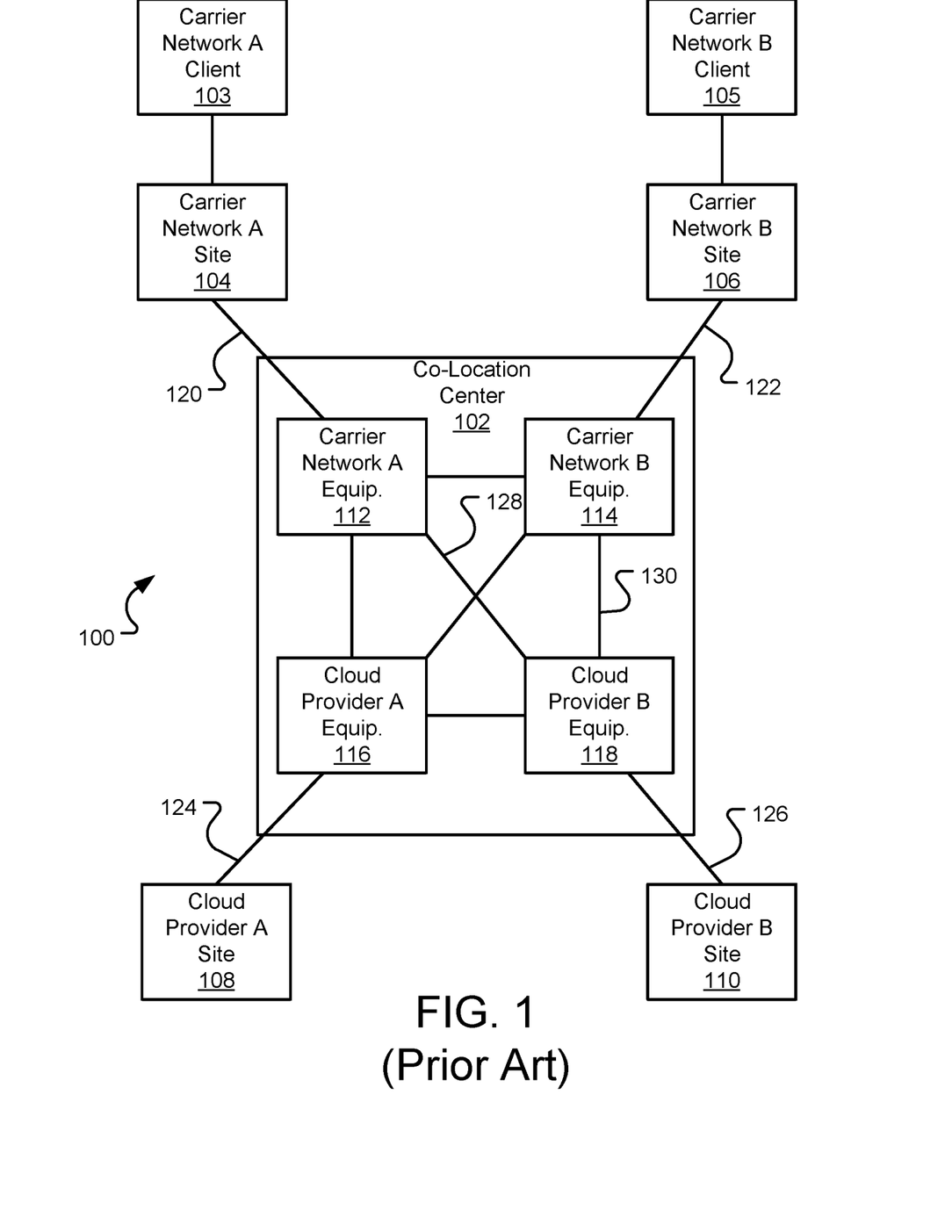
FIG. 1 is a schematic diagram illustrating a prior art network operating environment for optically interconnecting two or more sites.

Before discussing the optical switching element, FIG. 1 illustrates a prior art network operating environment 100 for optically interconnecting two or more carrier networks 104, 106 and cloud providers 108, 110 via a co-location center 102. To connect a client, such as carrier network A client 103, with a cloud provider, carrier network A may include a site 104 that connects to the co-location center 102 through one or more physical connections, such as one or more optical fiber cables 120. The fiber cable 120 may connect data or networking equipment at carrier network A 104 site and corresponding data or networking equipment 112 at the co-location center 102. Thus, carrier network A may locate equipment 112 at the co-location center 102 for communication, via the fiber cables 120, with carrier network A site 104. Carrier network B may similarly include a site 106 connected to corresponding carrier network B equipment 114 at the co-location center 102 via one or more fiber cables 122 to connect clients 105 of carrier network B to one or more cloud service providers. To connect a client of a carrier network to a cloud provider network, cloud provider networks may also co-locate data or network equipment at the co-location center 102. For example, cloud provider A may include cloud provider A equipment 116 to connect cloud provider A site 108 via one or more fiber cables 124. Cloud provider B may include cloud provider B equipment 118 to connect cloud provider B site 110 via one or more fiber cables 126. More or fewer networking sites may also include equipment within the co-location center 102 to interconnect with carrier networks A and B and/or cloud providers A and B.

Within the co-location center 102, the carrier networks and the cloud provider networks may be interconnected to exchange data communications between respective network clients 103, 105 and the cloud provider networks. For example, carrier network A equipment 112 may be connected with cloud provider B equipment 118 such that communications between carrier network A site 104 and cloud provider B site 110 may be exchanged. Through this interconnection, carrier network A may provide a transmission conduit to connect client A site 103 to cloud B provider site 110 such that cloud provider B may provide cloud services to carrier network A client site 103. To provide the interconnection between carrier network A equipment 112 and the cloud provider B equipment 118, an administrator or technician at the co-location center 102 may connect a physical jumper or other connection 128 between the carrier network A equipment 112 and cloud provider B equipment 118 within the co-location center 102. Interconnections between other sites connected to the co-location center 102 may occur in a similar manner. For example, cloud provider B site 110 may also connect to carrier network B site 106 via cross connect 130. Within co-location center 102, the various sites or ingress points to network carriers and cloud environments may be interconnected.

Although the co-location center 102 provides interconnection possibilities between participant sites connected to the co-location center, such interconnection may be costly for administrators of the participant sites. For example, co-location centers 102 often charge large fees to locate equipment within the co-location center, fees for a technician to perform a requested cross connect between co-located equipment, fees for terminating fiber cables within the center 102, etc. Further, carrier and cloud provider administrators often have no control over the geographic location of the co-location center 102 such that corresponding client sites 104-110 may, in some instances, need to be built geographically near the co-location center 102 for connection of the client sites 104-110 to the corresponding client equipment within the co-location center. Further, locating a client site 104-110 near the co-location center 102 may require building a chain of multiple sites to connect a network, such as carrier network A or carrier network B, to the co-location center 102. As should be appreciated, the costs to establish and maintain a connection to the co-location center 102 may be burdensome to carriers and/or cloud provider networks.

Figure 2:
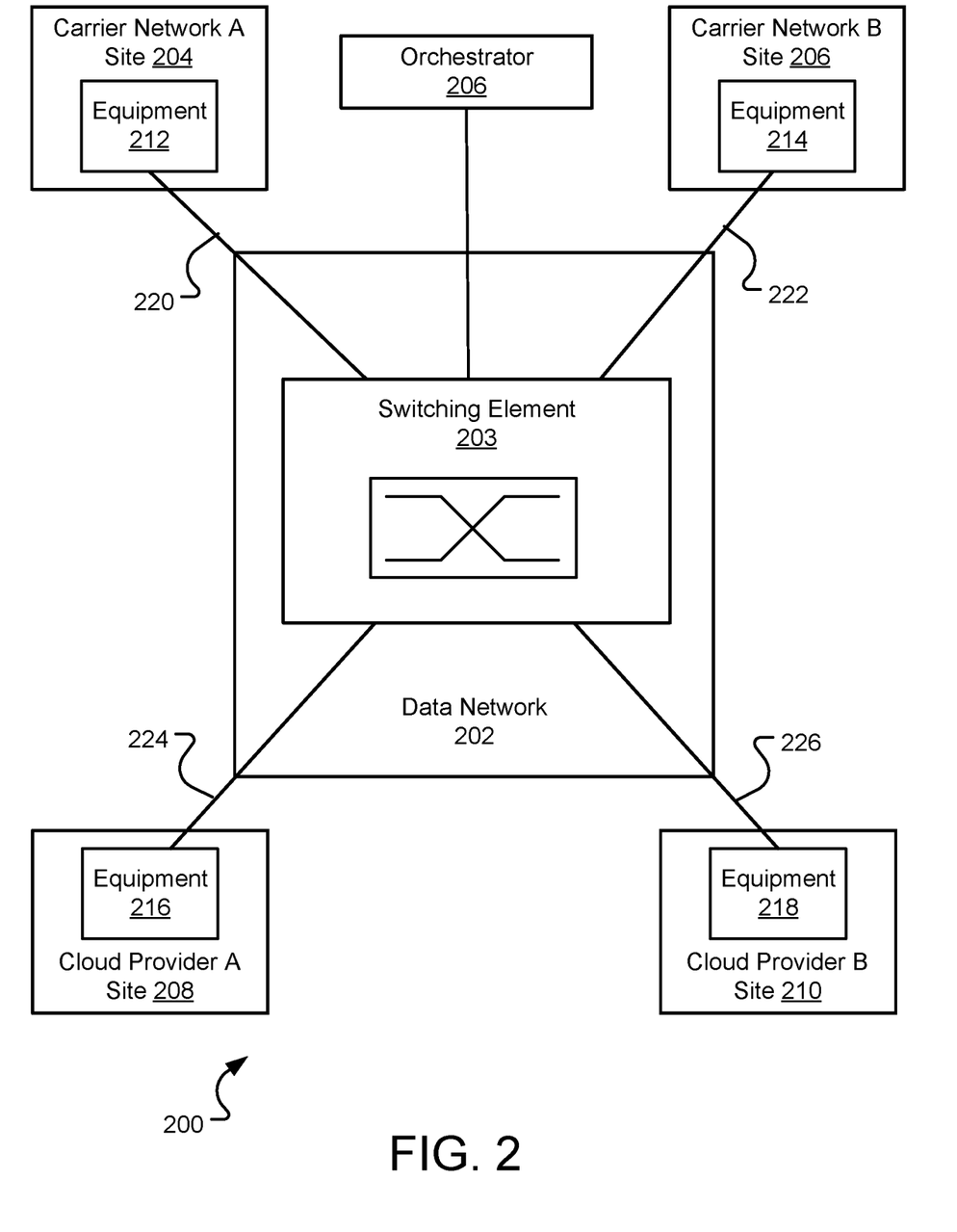
FIG. 2 is a schematic diagram illustrating a network operating environment for dynamically interconnecting two or more sites utilizing an optical peering fabric switching device in accordance with one embodiment.

In response to these and other issues, FIG. 2 illustrates an alternative network operating environment 200 that provides for dynamically interconnecting two or more sites 204-210 utilizing an optical peering fabric switching device 204 in accordance with one embodiment that removes the need for a co-location center 102 from the connection path. As explained in more detail below, the network environment 200 utilizes a network-based center 202 to interconnect wavelengths or other signals between client sites connected to a configurable optical switching element 203 of the network. The network environment 200 removes a requirement for locating network equipment within a co-location center 102 to interconnect networks such that client sites may retain network and data equipment within their corresponding client sites and connect directly to the network 202 for interconnecting to other client sites. The network environment 200 also removes a requirement for locating network equipment within a co-location center 102 to interconnect networks such that client sites may retain network and data equipment within their corresponding client sites and connect directly to the network 202 for interconnecting to other client sites. Further, the network operating environment 200 automates the cross connecting of the client sites based on a request, reducing the time to cross connect the sites and increasing the flexibility of the connections established via a network 202.

The network environment 200 of FIG. 2 includes two or more client or participant sites 204-210 connected to a data network 202. The data network 202 may be any type of interconnected devices that transmit and receive communication or data packets, such as a telecommunications network. In one example, a carrier network A site 204, a carrier network B site 206, a cloud provider A site 208, and a cloud provider B site 210 may be connected to the network 202 via one or more gateway devices on the edge of the data network 202. More or fewer networking or data sites may be connected to the network 202, including sites associated with content provider networks, access networks, additional cloud computing networks, additional carrier networks, and the like. Although shown as separate client sites 204-210, the carrier networks and the cloud provider networks (among other networks) may share a client site such that networking equipment for the various networks may be included in a site. Further, in one instance, each client site 204-210 may connect to the network 202 via one or more fiber cable connections. For example, carrier network A site 204 may connect to network 202 via fiber cable connection 220, carrier network B site 206 may connect to network 202 via fiber cable connection 222, cloud provider A site 210 may connect to network 202 via fiber cable connection 224, and cloud provider B site 212 may connect to network 202 via fiber cable connection 226. Fiber connections 220-226 may include, in some instances, dark fiber that connects the client sites 204-210 to the network 202 but does not currently carry data traffic prior to connecting to another client site or activation of the fiber transmission line. The fiber connections 220-226 may include multiple fibers to support various bandwidth requests for connectivity between the sites. For example, the fiber connections 220-226 may support 400 Gbps of bandwidth or four 100 Gbps increments of bandwidth based upon the prevailing technology and equipment supporting the participant sites. In this manner, each fiber connection 220-226 may be sized appropriately to the connected client site 204-210 to provide a desired bandwidth for the site.

Each of the fiber connections 220-226 may connect network or data equipment 212-218 at a respective client site 204-210 to a configurable optical switching element 203 of the network 202. Although shown as connecting directly, any number of routing or other networking devices may be within the transmission path between the client sites 204-210 and the switching element 203 of the data network 202. For example, one or more gateway or other network edge devices may be used to connect the client sites 204-210 with the switching element 203. The client sites 204-210 of the network environment 200 may communicate or otherwise exchange traffic or data via the switching element 203 once a connection of one or more signals or wavelengths connecting those sites is established in the switching element 203. In some instances, the switching element 203 and the client sites 204-210 may be located within the same metro or other geographic area, as is discussed in more detail below. Further, the network 202 may include any number of such switching elements 204, either within the same metro or in other metros supported by the network 202, to support the interconnection of client sites. The number of switching elements 203 within the data network 202 may be based on capacity of the elements (e.g., the number of communication ports for each switching element 203) and/or the number of client sites 204-210 to be interconnected. The single switching element 203 illustrated in FIG. 2 and the four client sites 204-210 connected to said switching element is shown here merely for illustrative purposes only and more such switching elements and client sites may be connected via the data network 202.

Through the connection to the switching element 203 of the network 202, the networks associated with the client sites 204-210 do not need to install and connect to additional equipment within the network 202, as is needed for connection to a co-location center 102 discussed above. Rather, the client sites 204-210 may be connected to the network 202 through a gateway site or other ingress devices into the network such that the networking or data equipment 212-218 utilized by the corresponding client sites 204-210 to connect to the network 202 may be retained within the respective client sites 204-210 themselves. For example, carrier network A may manage carrier network A site 204 and may locate networking or data equipment 212 associated with the carrier network A at the client site 204. The carrier network A site equipment 212 may terminate the fiber cable 220 connected to the switching element 203 of the network 202 and disperse traffic received over the fiber cable 220 to other components within carrier network A via the equipment 212. Similarly, other client sites (such as cloud provider A site 208) may include equipment 216 to terminate the respective fiber cables 224 to the network 202 and route traffic onto or received from the fiber cable 224 to other devices or locations within the corresponding cloud provider A network. Through the network environment 200 of FIG. 2, each of the networks connected via a client site 204-210 to network 202 may not be required to locate network equipment at both ends of the connecting fiber 220-226 as in co-location centers 102. Rather, each network may maintain their equipment 212-218 at their respective client sites 204-210 for communicating with the network 202 and for receiving traffic from the network. This provides additional security to the operation of the equipment 212-218 as control over the equipment may be maintained by the respective networks. Further, as the need for terminating equipment is reduced, the cost for connecting each connected client network to the data network 202 is also reduced.

As mentioned above, the switching element 203 may be configurable to interconnect wavelengths received via the fiber cables 220-226 from the connected client sites 204-210. In one instance, the switching element 203 may be a reconfigurable optical add-drop multiplexer (ROADM) networking device, although other optical fabric switching devices are also contemplated. In general, the switching element 203 connects wavelengths or other signals received at an input (in some instances referred to as a "degree") to an output (also referred to as a "degree") based on one or more configuration signals received at the switching element 203. For example, the switching element 203 may connect fiber cable 222 from carrier network B site 206 to fiber cable 224 from cloud provider A site 208. The switching element 203 may include multiple interfaces or degrees that may be connected to any other interface or degree. For example, a twelve degree switching element 203 may connect twelve separate interfaces or degrees for exchanging of traffic over multiple signals or wavelengths between the connected interfaces. In this manner, the client sites 204-210 of the network environment 200 may communicate or otherwise exchange traffic or data via the switching element 203 once a connection of one or more signals or wavelengths connecting those sites is established in the switching element 203.

In one instance, the switching element 203 may service a metro such that interconnection between client sites within the metro may be providing via the switching element. Further, the connectivity provided by the switching element 203 may accommodate a dynamically controllable connection with a certain bandwidth granularity for each connection, such as in 100 Gigabytes per second (Gbps) increments. Further, a switching element 203 servicing a metro or other area of the data network 202 may provide connectivity for every pair of the metro client sites connected to the switching element 203. For example, the switching element 203 may provide connectivity from carrier network A site 204 to carrier network B site 206, carrier network A site 204 to cloud provider A site 208, carrier network A site 204 to cloud provider B site 210, carrier network B site 206 to cloud provider A site 208, carrier network B site 206 to cloud provider B site 210, and cloud provider A site 208 to cloud provider B site 210. Each cross connection between the client sites 204-210 may be dynamically made in groups of 100 Gbps increments or any other bandwidth increment.

In still other instances, an orchestrator system or device 206 may be in communication with the switching element 203 to control or configure the connections of the degrees of the switching element. As explained in more detail below, the orchestrator 206 may receive a request to connect two client sites 204-210 via the switching element 203 and, upon authentication and authorization of the connection request, communicate with the switching element 203 to instantiate the requested connection. Once the switching element 203 is configured based on the connection request, the two client sites may communicate via the network 202 without utilizing a co-location center 102 to connect the networks. The operations of the orchestrator 206 of the network environment 200 are described in more detail below with reference to the systems and methods of FIGS. 3 and 4. One particular example of an orchestrator 206 is disclosed in U.S. Patent Application No. 62/948,706, the entirety of which is hereby incorporated by reference in its entirety for all purposes.

Figure 3:
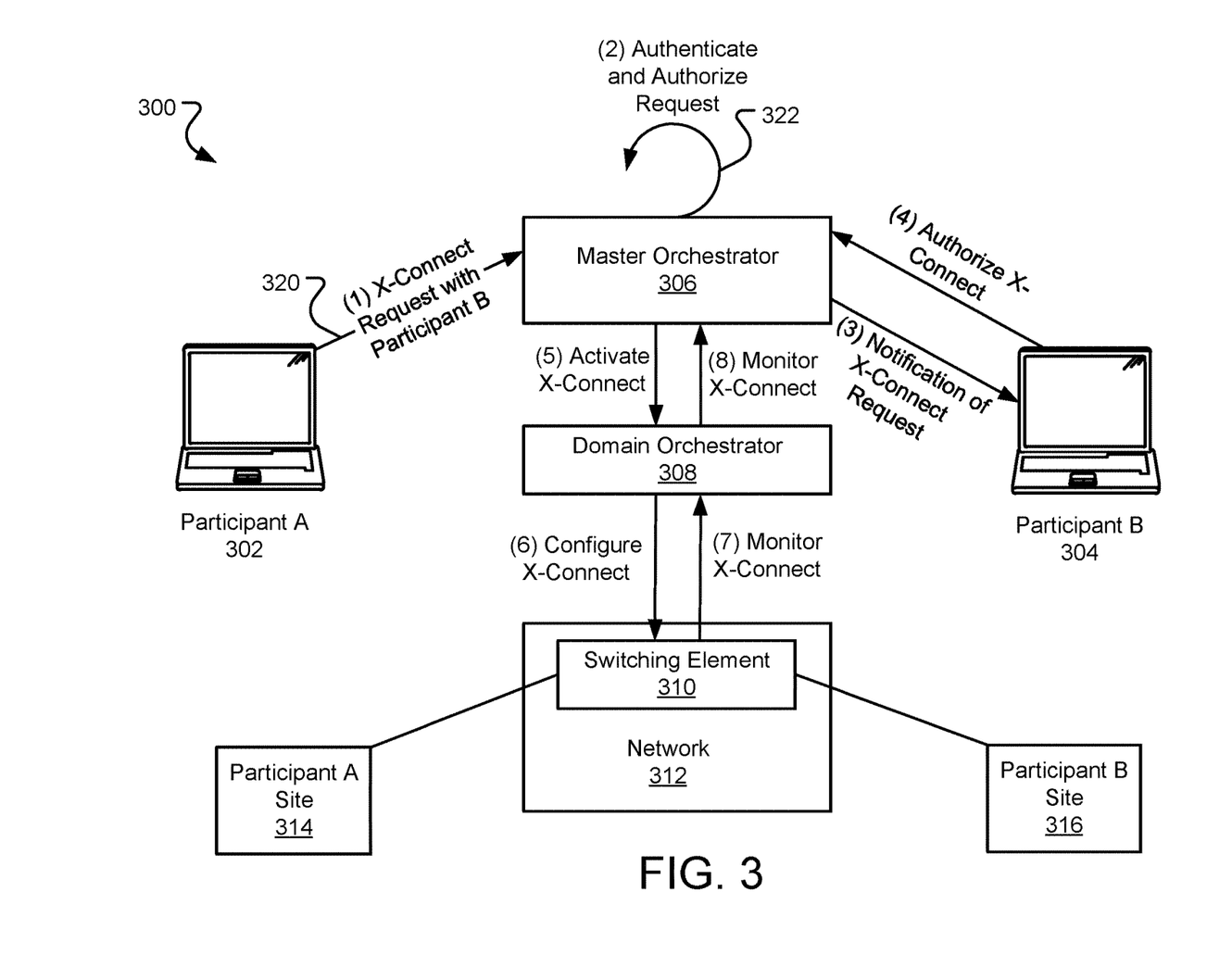
FIG. 3 is a schematic diagram illustrating a system for controlling dynamic interconnection between two or more sites utilizing an optical peering fabric switching device in accordance with one embodiment.

More particularly, FIG. 3 is a schematic diagram illustrating a system 300 for controlling dynamic interconnection between two or more participant sites 314,316 utilizing an optical peering fabric switching device 310 in accordance with one embodiment. Many of the components of the system 300 of FIG. 3 are similar to components discussed above with relation to the network environment 200 of FIG. 2. For example, the system 300 may include a telecommunications or data network 312 including a switching element 310, such as a ROADM or other optical switching device. A first client or participant site 314 and a second client or participant site 316 may be connected to the switching element 310 via the network 312. The switching element 310 may, in some instances, be configurable to provide a connection between participant A site 314 and participant B site 316 in response to one or more configuration instructions or commands. In one example, a master orchestrator 306 may initiate the one or more configuration commands based on a request received at the master orchestrator 306 to connect the participant sites 314,316. Additional components of the system 300 may also be included, such as a participant A computing device 302 associated with an administrator of a first network associated with the participant A site 314, a participant B computing device 304 associated with an administrator of a second network associated with the participant B site 316, and a domain orchestrator 308 for communicating with the configurable switching element 310. In one particular example, participant A computing device 302 may be associated with a carrier network and participant B computing device 304 may be associated with a cloud provider network, although other types of networks and network sites are contemplated.

To connect participant A site 314 to participant B site 316, participant A computing device 302 may generate and transmit a request 320 for the connection to the master orchestrator 306. In particular, the participant A computing device 302 may access an application programming interface (API) or interface portal associated with master orchestrator 306 to provide the connection request 320. The API may, in some instances, be a REST-based API. The participant A computing device 302 may generate the request 320 based on inputs received at the computing device from an administrator or other controller of the network associated with the participant A computing device 302 and/or participant A site 314. In another example, the connection request 320 may be generated automatically based on network performance, a network configuration plan, an instruction received from a networking provisioning system, and the like. Based on the inputs received at the computing device 302 from the network administration or provisioning system, the connection request 320 may be generated. The request 320 may include an identification of the two sites 314,316 to be connected, an identification of the requesting party or network, an identification of a geographical location of the two sites and/or the switching element 310, and the like.

Figure 4:
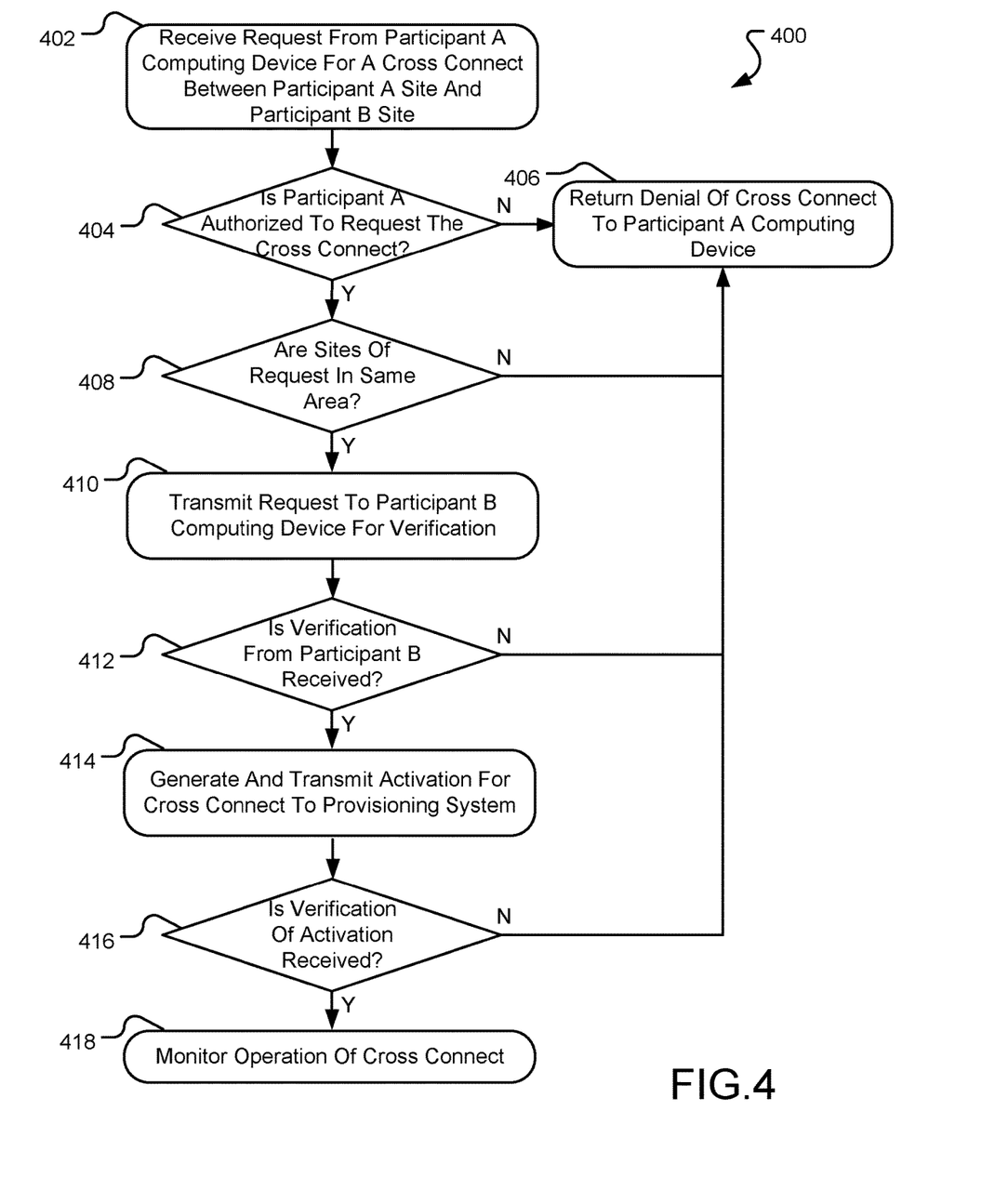
FIG. 4 is a flowchart of a method for configuring an optical switching element of a network in response to request to interconnect two participant sites connected to the network in accordance with one embodiment.

Upon receipt of the connection request 320, the master orchestrator 306 may authenticate and/or authorize 322 the request. In particular, FIG. 4 is a flowchart of a method 400 for configuring an optical switching element 310 of a network 312 in response to request to connect two participant sites 314,316 connected to the network in accordance with one embodiment. In one example, the operations of the method 400 may be performed by the master orchestrator 306 illustrated in FIG. 3. In other instances, one or more of the operations of the method 400 may be performed by other components of the system 300 of FIG. 3, such as domain orchestrator and/or switching element 310. The operations of the method 400 may be performed using software programs, hardware components, or a combination of hardware and software.

Beginning in operation 402, the orchestrator 306 may receive a request to connect two participant sites 314,316 from a computing device, such as from participant A computing device 302. The request 320 may take the form discussed above and include identification of a first participant site 314, a second participant site 316, a requesting party or requesting computing device 320, a geographic location of the sites 314,316 to be connected, and the like. In response to receiving the connection request 320, the orchestrator 306 may, in operation 404, determine if the requesting party or computing device 302 is authorized to request the connection between the sites 314,316. In particular, the orchestrator 306 may determine if participant A (and more particularly, participant A site 314) is connected to the network 312 in the market or area indicated in the request. If participant A site 314 is not connected to the network 312 in the indicated location, a connection to participant B site 316 may not be instantiated in switching element 310 as no participant A site is available to connect via switching element to participant A site. Further, the orchestrator 306 may determine an identity of the party providing the request, such as participant A computing device 302, to determine if the requestor is validly associated with the participant A network and authorized to request the connection between the sites. In one example, the participant A computing device 302 may provide one or more credentials to orchestrator 306 for authorization along with the request for the connection. Orchestrator 306 may, in turn, compare the received credential information to a database of client identifiers/permissions to verify the identity of the requesting device 302 and to determine authorizations associated with the identified party for requesting a connection. If the participant A computing device 302 is not authorized to request the connection as identified in the request, the orchestrator 306 may return a denial of the connection request to the participant A computing device 302 in operation 406 and terminate the interconnection process.

If the orchestrator 306 verifies participant A computing device 302 as authorized to request the connection, the orchestrator 306 may authenticate the request in operation 408 by verifying the connection request can be implemented. For example, the orchestrator 306 may determine participant B site 316 is connected to switching element 310 in the indicated location or market of the request. Further, the orchestrator 306 may determine a fiber connection between participant A site 314 and the switching element 310 and participant B site 316 and the switching element. In one example, the connection request 320 may include a requested bandwidth for the connection between the sites 314,316. In such circumstances, the orchestrator 306 may verify the fiber connections to the sites 314,316 can support the requested bandwidth of the connection request 320. The orchestrator 306 may also verify other aspects of the requested connection to ensure the sites 314,316 may utilize the switching element 310 of the network 312 to exchange data and traffic.

If the requested connection cannot be authenticated in operation 408, the orchestrator 306 may return a denial of the connection request to the participant A computing device 302 in operation 406. Otherwise, the orchestrator 306 may transmit the request to participant B computing device 304 for verification in operation 410. In some instances, the orchestrator 306 may generate and transmit a notification of the connection request that includes some of the information included in the received connection request. Returning to the system 300 of FIG. 3, the master orchestrator 306 transmits the notification to the participant B computing device 304. Upon receiving the notification, the participant B computing device 304 may authorize the connection based on the information included in the notification. For example, the participant B computing device 304 may verify participant B site 316 is connected to the same switching element 310 as participant A site 314 or connected to a switching element in the same location as indicated in the request. Participant B computing device 304 may also verify the fiber cables connecting participant B site 316 to the network 312 satisfy the requested bandwidth for the connection. For example, some bandwidth requests may require more than a single fiber connection. Thus, participant B computing device 304 (and/or the master orchestrator 306) may verify the presence of enough fiber connections between the switching element 310 and the participating sites at issue in the request to support the requested bandwidth. Participant B computing device 304 may also verify participant A computing device 302 is authorized to request the connection to participant B site 316 via switching element 310. Upon authentication and/or authorization, participant B computing device 304 may return the authorization to the master orchestrator 306.

In some instances, the orchestrator 306 may not verify the connection request with the participant B computing device 304. Rather, the orchestrator 306 may include permissions provided by one or more participant sites 314,316 connected to the network 312 such that the orchestrator 306 may verify, authorize, and/or authenticate connection requests received from a requesting party or device.

The orchestrator 306 may, in operation 412 of the method 400 of FIG. 4, determine if the connection request is verified and authorized. If participant B computing device 304 does not verify or authorize the requested connection or if the permissions maintained by the orchestrator indicate the request is not authorized, the orchestrator 306 may transmit a denial to the request to the participant A computing device 302 in operation 406. If participant B computing device 304 or the orchestrator 306 verifies the requested connection, the orchestrator may, in operation 414, generate and transmit an activation signal for the configurable switching element 310 to provision the switching element to connect the degree or interface of the element associated with participant A site 314 and the degree or interface of the element associated with participant B site 316. The activation signal may include any number of transmissions, instructions, commands, and the like for processing and executing by the switching element 310 or a provisioning system associated with the network 312. For example and as shown in FIG. 3, the activation signal may be transmitted to a domain orchestrator 308 by the master orchestrator 306. The domain orchestrator 308 may be in communication with the switching element 310 (among other network devices) and may provide configuration instructions or commands to the switching element 310. The domain orchestrator 308 in this example may receive the activation signal from the master orchestrator 306 and, in response, generate and transmit a connection configuration signal to the switching element 310. In one instance, the master orchestrator 306 may provide information associated with connection request 320, such as an identification of the participant sites 314,316 to be connected. The domain orchestrator 308 may access network configuration information from one or more databases to identify the interfaces or degrees of the switching element 310 associated with the participant sites 314,316. With the network configuration information, the domain orchestrator 308 may instruct the switching element 310 to connect the interfaces or degrees of the switching element associated with the sites 314,316 to connect the sites. In this manner, the system 300 of FIG. 3 may dynamically interconnect sites 314,316 via the switching element 310 in response to a request received at the orchestrator 306 from a computing device associated with a network. This connection may occur without physically connecting equipment associated with the connected sites 314,316 and without utilizing a co-location center. Rather, the connection may occur within network 312.

In some instances, the switching element 310 may provide operational status information of the configuration of the switching element, such as which interfaces are interconnected within the switching element 310. For example, switching element 310 may provide, to the domain orchestrator 308 or the master orchestrator 306, a verification signal of the configured connection in response to the activation signal. In another example, the domain orchestrator 308 may receive the verification signal of the connection from the switching element 310 and provide an additional or the same verification signal to the master orchestrator 306. Regardless of the configuration of the system 300, the master orchestrator 306 may determine if a verification signal for the requested connection is received from the switching element 310. If the verification signal is not received, the orchestrator 306 may provide to participant A computing device 302 a denial of the connection request in operation 406. If the verification of the activation of the connection is received, the orchestrator 306 may monitor the status of the connection in operation 418. For example, similar to the verification signal, the switching element 310 may provide a monitoring signal to the domain orchestrator 308 or the master orchestrator 306. The monitoring signal may indicate to the orchestrator an operational status of the connection for reporting to the participant A computing device 302 and/or the participant B computing device 304, or any other device in communication with the orchestrator 306. The method 400 and system 300 described above may therefore provide for a dynamically interconnecting wavelengths among participants between one or more sites connected to a configurable switching element.

Figure 5:
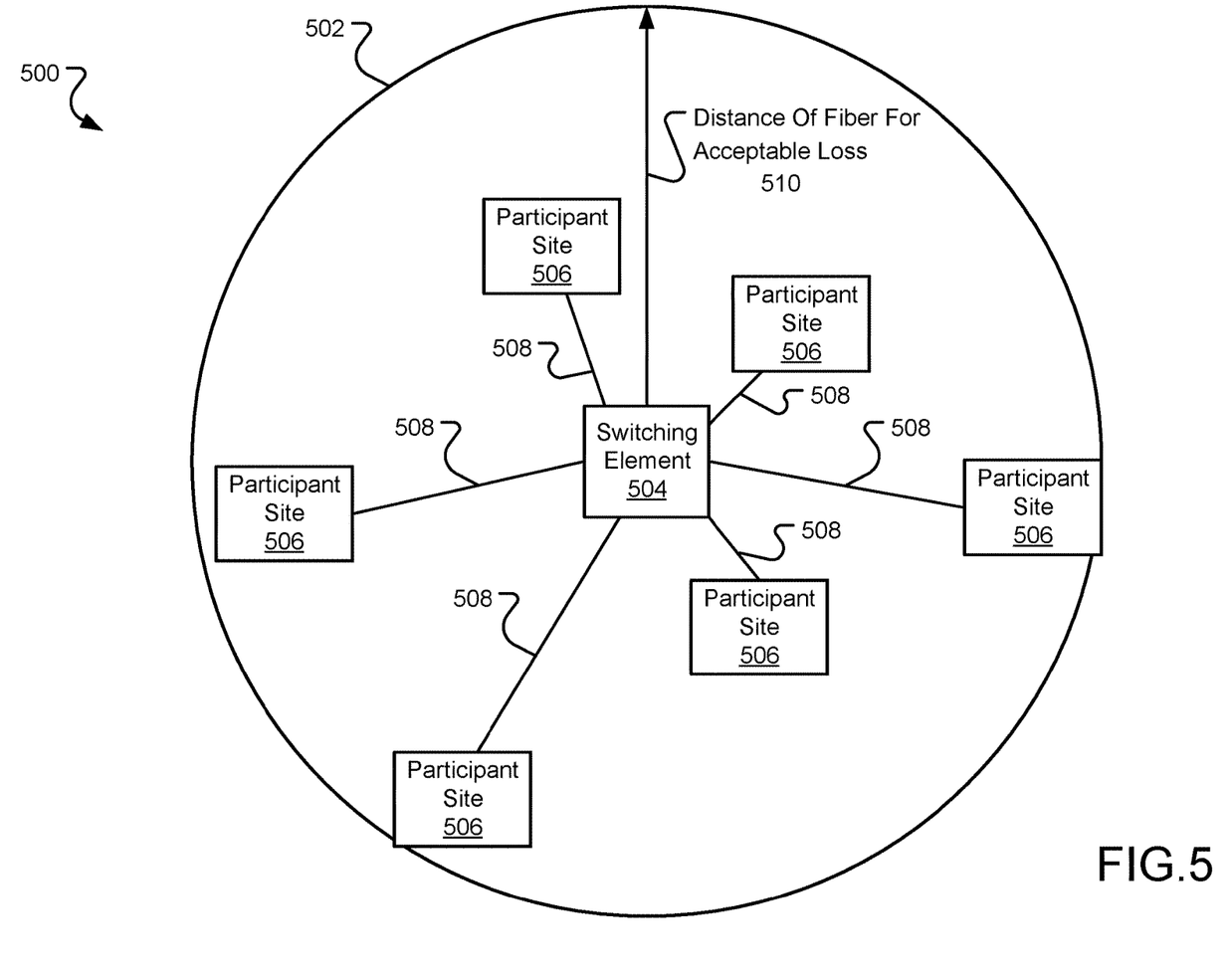
FIG. 5 is a schematic diagram illustrating a network area for dynamically interconnecting two or more sites utilizing an optical peering fabric switching device in accordance with one embodiment.

FIG. 5 is a diagram 500 illustrating a network geographic area 502 for dynamically interconnecting two or more participant sites 506 utilizing an optical switching device 504 in accordance with one embodiment. As discussed above, many participant sites 506 may connect to the switching element 504 depending on the number of degrees or interfaces of the switching element 504. For example, the diagram 500 of FIG. 5 illustrates six participant sites 506 connected to the switching element 504 for connecting between the sites. The switching element 504 or network hosting the switching element may also be configured to provide the connection service to a particular geographic area 502. In some instances, the geographic area 502 serviced by switching element 504 may be based on an acceptable loss in the fiber connections 508 connecting the participant sites 506 and the switching element 504. For example, the network 202 and/or participant sites 506 may establish an acceptable line loss for the fiber cable bundles 508 connecting the participant sites 506 with the switching element 504. The acceptable line loss may determine a maximum distance 510 of fiber connections to the switching element 504 by the participant sites 506. In other words, participant sites 506 within the acceptable line loss distance 510 may be connected to the switching element 504 to receive dynamic connection services from the network 202. In this manner, the geographical area supported by the switching element 504 may be based on an acceptable line loss within the fiber connections 508 between the participant sites 506 and the switching element 504. In some instances, however, a fiber connection 508 connecting the switching element 504 and a participant site 506 may not be a straight line but may include angled portions that increase the length of the fiber connections. As such, the maximum distance 510 for connecting to the switching element 504 may include the total distance of the connecting fiber 508 along the entire length of the connection. Regardless of the form of the fiber connection 508, an acceptable transmission line loss of the fiber connector 508 may be utilized to determine a service area for providing the dynamic connection service to the participating sites 506.

The allowable fiber distance for acceptable loss 510 may also be based on a requested bandwidth for the communication between the participant sites. For example, the acceptable loss for a 400 Gbps bandwidth signal may be N dB, where N represents a negative number, such that the distance 510 from the switching element 504 to the outer edge of the service area 502 may be defined by the loss within a fiber cable 508 at distance x 502 for a 400 Gbps bandwidth signal. Other bandwidths may define other acceptable losses such that the distance x 510 may vary. For example, a 600 Gbps bandwidth signal may have an acceptable loss of N[x] to N[y] dB and a 800 Gbps bandwidth signal may have an acceptable loss of N[t] to N[v] dB, where x,t represents the lower bound number y,v represents the upper bound number in each applicable range. Each of the acceptable losses may define a distance 510 for the service area 502 of the switching element. Further still, fiber technology may also affect the distance of acceptable loss 510. In particular, as fiber transmission technology improves, the service area 502 for the switching element 504 may increase as less signal loss is experienced in the fiber cables 508. In this manner, a service area 502 for providing dynamic interconnecting between participant sites 506 may be based on an acceptable line loss in fiber cable technology to ensure that each participant site 506 is within the acceptable loss distance 510. In contrast, co-location centers 102 typically require participant sites 506 to be located near the co-location center and locate transmission equipment within the co-location center 102 for interconnecting other participant sites 506.

Figure 6:
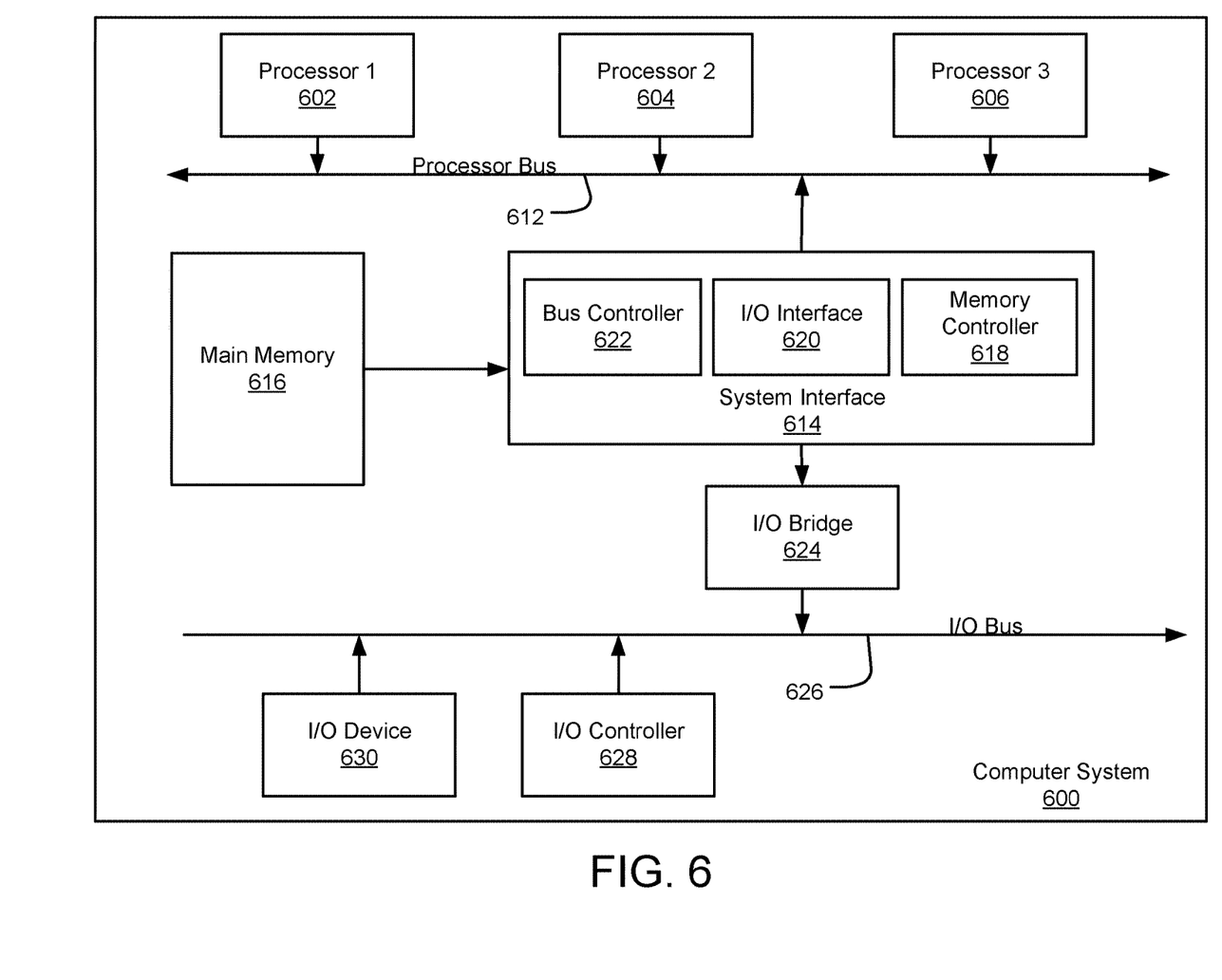
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the components of the network disclosed above. For example, the computing system 600 of FIG. 6 may be the orchestrator 306 discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 614 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for providing a data network, the method comprising:
connecting, via a plurality of optical fiber connections, a plurality of participant sites to an optical switching device, each of the plurality of participant sites connected to the optical switching device with a respective optical fiber connection of the plurality of optical fiber connections, wherein a total length of each of the respective optical fiber connections defines a network service area with an outer boundary defined by a maximum total length of optical fiber with a transmission line loss measurement less than an acceptable transmission line loss value based on a type of the optical fiber of the respective optical fiber connection.

2. The method of claim 1 wherein the network area is further defined by a bandwidth value for transmission of data from the optical switching device.

3. The method of claim 2 wherein the transmission line loss value comprises an upper bound, based on the bandwidth value for the transmission of data, of line loss and a lower bound, based on the bandwidth value for the transmission of data, of line loss.

4. The method of claim 1 wherein the total length of at least one of the plurality of optical fiber connections comprises a length of a first portion of the at least one of the plurality of optical fiber connections plus a length of a second portion of the at least one of the plurality of optical fiber connections.

5. The method of claim 1 wherein the first site of the plurality of participant sites comprises first fiber terminating equipment, the respective optical fiber connection of the plurality of optical fiber connections for the first site connecting the first fiber terminating equipment of the first site and a first interface of the optical switching device.

6. The method of claim 5 wherein the second site of the plurality of participant sites comprises second fiber terminating equipment, the respective optical fiber connection of the plurality of optical fiber connections for the second site connecting the second fiber terminating equipment of the second site and a second interface of the optical switching device.

7. The method of claim 6 wherein the optical switching device dynamically connecting, in response to a connection request, signals or wavelengths of the first interface of the optical switching device to signals or wavelengths of the second interface of the optical switching device.

8. The method of claim 7 wherein the optical switching device is a reconfigurable optical add-drop multiplexer network device.

9. The method of claim 1 further comprising:
locating, within the network service area, a new participant site; and
connecting the new participant site to the optical switching device, wherein the location of the new participant site within the network service area is based on the type of optical fiber of the respective optical fiber connection for the new participant site and the acceptable transmission line loss value.

10. A non-transitory computer-readable storage medium, storing a computer program, wherein the computer program, when executed by a processor, causes the processor to perform a method comprising:
determining a network service area of a plurality of participant sites connected to an optical switching device via a plurality of optical fiber connections, each of the plurality of participant sites connected to the optical switching device with a respective optical fiber connection of the plurality of optical fiber connections, wherein a total length of each of the respective optical fiber connections is defined by an acceptable transmission line loss value based on a type of optical fiber of the respective optical fiber connection.

11. The non-transitory computer-readable storage medium of claim 10 wherein the total length of each of the respective optical fiber connections defines a network service area with an outer boundary defined by a maximum total length of the type of optical fiber with a transmission line loss measurement less than the acceptable transmission line loss value.

12. The non-transitory computer-readable storage medium of claim 11 wherein the network area is further defined by a bandwidth value for transmission of data from the optical switching device.

13. The non-transitory computer-readable storage medium of claim 12 wherein the transmission line loss value comprises an upper bound, based on the bandwidth value for the transmission of data, of line loss and a lower bound, based on the bandwidth value for the transmission of data, of line loss.

14. The non-transitory computer-readable storage medium of claim 10 wherein the total length of at least one of the plurality of optical fiber connections comprises a length of a first portion of the at least one of the plurality of optical fiber connections plus a length of a second portion of the at least one of the plurality of optical fiber connections.

15. A telecommunications network comprising a plurality of participant sites connected, via a plurality of optical fiber connections, to an optical switching device, each of the plurality of participant sites connected to the optical switching device with a respective optical fiber connection of the plurality of optical fiber connections, wherein a total length of each of the respective optical fiber connections is defined by an acceptable transmission line loss value based on a type of optical fiber of the respective optical fiber connection.

16. The telecommunications network of claim 15 wherein the total length of each of the respective optical fiber connections defines a network service area with an outer boundary defined by a maximum total length of the type of optical fiber with a transmission line loss measurement less than the acceptable transmission line loss value.

17. The telecommunications network of claim 16 wherein the network area is further defined by a bandwidth value for transmission of data from the optical switching device.

18. The telecommunications network of claim 17 wherein the transmission line loss value comprises an upper bound, based on the bandwidth value for the transmission of data, of line loss and a lower bound, based on the bandwidth value for the transmission of data, of line loss.

19. The telecommunications network of claim 15 wherein the optical switching device is a reconfigurable optical add-drop multiplexer network device.

20. The telecommunications network of claim 15 wherein the total length of at least one of the plurality of optical fiber connections comprises a length of a first portion of the at least one of the plurality of optical fiber connections plus a length of a second portion of the at least one of the plurality of optical fiber connections.

* * * * *